United States Patent [19]

Takeuchi et al.

[11] Patent Number: 4,557,179
[45] Date of Patent: Dec. 10, 1985

[54] VACUUM BOOSTER DEVICE

[75] Inventors: Hiroo Takeuchi, Asashina; Nobuaki Hachiro; Yoshihisa Miyazaki, both of Ueda, all of Japan

[73] Assignee: Nissin Kogyo Kabushiki Kaisha, Nagano, Japan

[21] Appl. No.: 682,472

[22] Filed: Dec. 17, 1984

Related U.S. Application Data

[63] Continuation of Ser. No. 272,254, Jun. 10, 1981, abandoned.

[30] Foreign Application Priority Data

Sep. 25, 1980 [JP] Japan .............................. 55-133317

[51] Int. Cl.[4] .............................................. F01B 11/02
[52] U.S. Cl. .................................... 91/369 A; 92/99; 92/165 PR; 92/169
[58] Field of Search ................ 92/98 D, 169.2, 169.3, 92/169.4, 99, 165 PR; 91/369 A, 376 R

[56] References Cited

U.S. PATENT DOCUMENTS

| | | | |
|---|---|---|---|
| 2,969,046 | 1/1961 | Kellogg | 92/99 |
| 4,270,438 | 6/1981 | Thomas | 92/98 D |
| 4,271,750 | 6/1981 | Thomas | 92/98 D |
| 4,283,993 | 8/1981 | Hayashida | 92/98 D |
| 4,292,887 | 10/1981 | Ohta | 92/98 D |
| 4,325,218 | 4/1982 | Weiler | 92/98 D |
| 4,338,854 | 7/1982 | Margetts | 92/98 D |
| 4,339,921 | 7/1982 | Schanz | 92/98 D |
| 4,377,966 | 3/1983 | Parker | 92/98 D |
| 4,418,611 | 12/1983 | Tateoka | 92/169.3 |

FOREIGN PATENT DOCUMENTS

| | | | |
|---|---|---|---|
| 945287 | 12/1963 | United Kingdom | 92/99 |
| 2051270 | 1/1981 | United Kingdom | 92/166 |

*Primary Examiner*—Abraham Hershkovitz
*Attorney, Agent, or Firm*—Armstrong, Nikaido Marmelstein & Kubovcik

[57] ABSTRACT

A vacuum type brake booster device comprising a booster shell, a booster piston accommodated in the booster shell, a piston diaphragm working together with the booster piston for dividing the booster shell into both front and rear working chambers, and tie rods extending through the piston and the diaphragm for connection of the front and rear walls of the booster shell. Circumferential positioning devices are arranged between the booster piston and piston diaphragm and between the piston diaphragm and booster shell, respectively, so that the piston can correctly be adapted to the shell. Accordingly, the booster piston can be operated freely from interference of the tie rods. Furthermore, the piston diaphragm can be prevented from unnecessary forces due to the pressure difference between both the working chambers by the aid of thin-wall portions arranged in the piston diaphragm.

3 Claims, 5 Drawing Figures

VACUUM BOOSTER DEVICE

This application is a continuation, of application Ser. No. 272,254, filed June 10, 1981, now abandoned.

BACKGROUND OF THE INVENTION

This invention relates to automotive brake master cylinder vacuum booster devices and, more particularly, to improvements in those of the type comprising a booster shell, an axially slidable booster piston accommodated in the booster shell, a piston diaphragm the inner and outer peripheral edges of which are respectively fixed to the rear surface of the booster piston and the inner peripheral surface of the booster shell, a front side first working chamber and a rear side second working chamber defined in the booster shell by the booster piston and piston diaphragm, said first working chamber commumicating with a vacuum source, said second working chamber selectively communicating with the first working chamber or the external atmosphere through a control valve, an input rod arranged opposite to the booster piston for movement toward and away from the latter and connected to the control valve so as to produce a pressure difference between both the working chambers effective to cause the booster piston to follow forward movement of the input rod, tie rods extending through the booster piston for connection of the front and rear walls of the booster shell, and a flexible bellows arranged between the tie rod and booster piston for enabling the booster piston to be operable.

When the above-mentioned booster device is operated, the booster shell can be protected from effect of the forward thrust loaded to the master cylinder by transmitting the load to the automobile body through the tie rods, so that such rigidity high enough to bear the thrust loading is not required to be given and, what is advantageous, the booster shell can be made less in weight by being formed of thin steel sheets, synthetic resins or the like.

As mentioned above, in case of said booster device, the bellows is arranged between the booster piston and therethrough passing tie rod so that, unless the booster piston is correctly positioned in the circumferential direction with respect to the booster shell, the operation of the booster piston is likely to be hindered by the interference of the booster piston to the tie rod and also the bellows is subjected to the twist which may cause the decrease of the durability thereof.

Portion of the piston diaphragm located between inner peripheral surface of the booster shell and outer peripheral surface of the booster piston is formed turned so as to make the diaphragm section of U-shape projecting into the first working chamber, and the booster piston can be moved forward and backward with the movement of the U-shaped turning part. However, if a brake pedal is depressed and the booster piston is advanced while the vacuum pressure is not yet accumulated in the first working chamber, that is, when the vacuum pressure is not produced in the vacuum source, a pipe line communicating the first working chamber with the vacuum source goes wrong or else, the air inside the first working chamber is not sufficiently discharged into the vacuum supply source due to the resistance inside the pipe line or the like. As a result, the remaining air inside the first working chamber is compressed and the air pressure of the second working chamber is exceeded by that of the first working chamber so that the piston diaphragm is swelled out to the second working chamber side by the aforesaid pressure difference and the said U-shaped turning part is likely to be turned over. Application of such an unnecessary pressure to the piston diaphragm is not desirable since the durability of the piston diaphragm is thereby decreased.

SUMMARY OF THE INVENTION

The present invention has been proposed to satisfy such requirements as mentioned above and has for its primary object the provision of a new and improved vacuum booster device of the type described which is capable of correctly positioning the booster piston in circumferential direction with respect to the booster shell through the piston diaphragm.

Another object of the present invention is to provide a new and improved vacuum booster device of the type described which is of simple but effective construction capable of avoiding the application of such unnecessary pressure as aforementioned to the piston diaphragm by placing both the first and second working chambers into communication with each other and equalizing the air pressure of both the working chambers without delay by the use of the positioning mechanism for preventing the relative circumferential movement between the inner periphery of the piston diaphragm and the booster piston when the air pressure of the second working chamber is exceeded by that of the first working chamber wherein the vacuum pressure is not accumulated.

The above and other objects, features and advantages of the present invention will become apparent from the following description when taken in conjunction with the accompanying drawings, which illustrate a presently preferred embodiment of the invention.

DESCRIPTION OF THE PREFERRED EMBODIMENT

Figure 1:
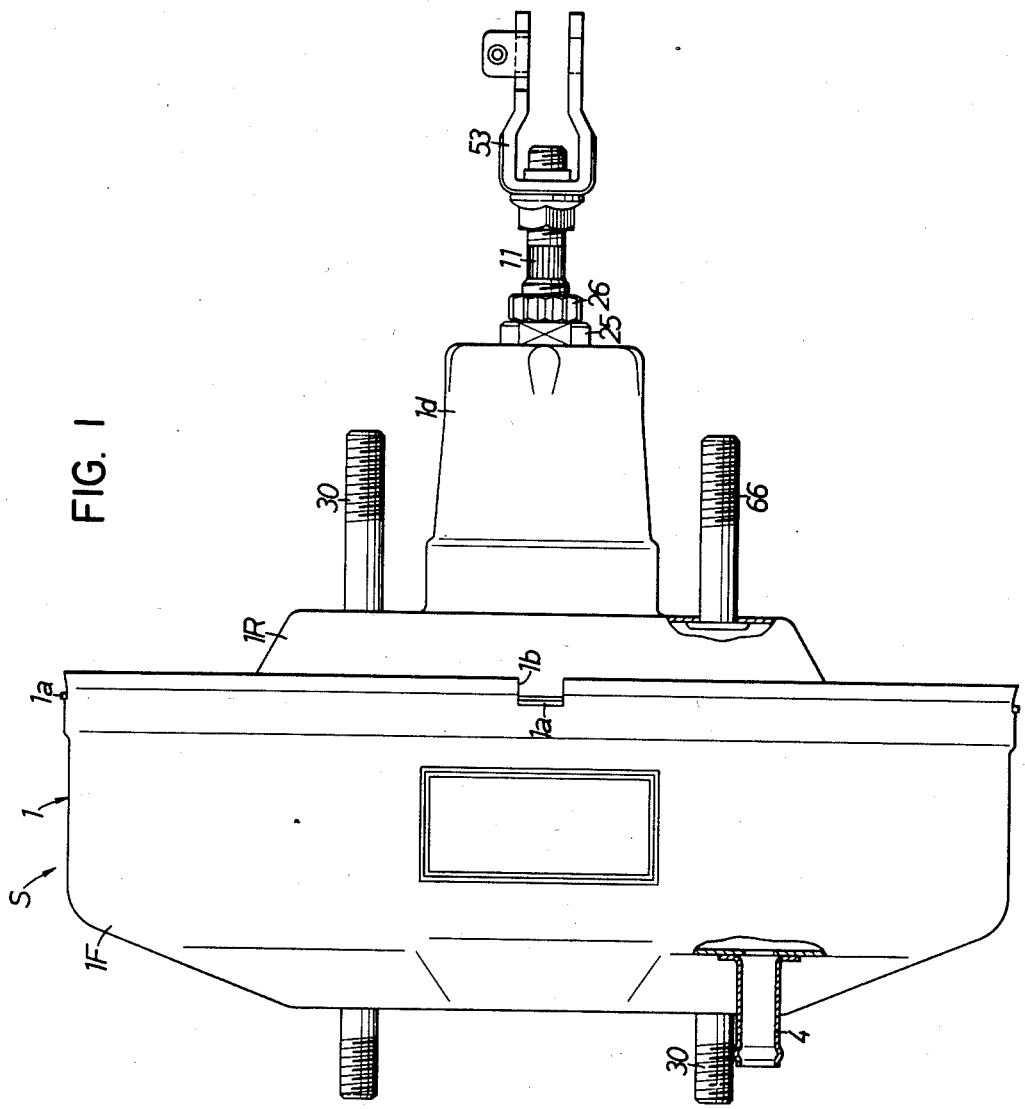
FIG. 1 is a side elevation illustrating a preferred form of vacuum booster device embodying the present invention.

An embodiment of the present invention will be explained with reference to the drawings.

In the figure, a vacuum booster device, generally denoted by S, has a booster shell 1 which is composed of a pair of front and rear bowls 1F and 1R formed of light thin steel plate or synthetic resin. The rear bowl 1R has a plurality of projections 1a formed around an opening of the rear bowl 1R at equal circumferential intervals. The projections 1a are fitted to a plurality of notches 1b formed around an opening of the front bowl 1F at equal circumferential intervals so as to position the bowls 1F and 1R in place. The bowls 1F and 1R are connected together through two tie rods 30 extending between opposing front and rear walls thereof. The onnection between the booster shell 1 and tie rods 30 will be described later in detail.

A booster piston 2 is axially and slidably accommodated in the booster shell 1 and an annular groove 61 is ormed on the rear side of the booster piston 2.

Annular beads 3a and 3b are respectively formed round outer and inner peripheries of a piston diahragm 3. The outer annular bead 3a is held fixed between both the bowls 1F and 1R after two positioning rojections 3c formed around the end surface of the ead 3a at equal circumferential intervals are respecvely fitted in each of positioning holes 1c formed round the outer periphery of the rear bowl 1R. A leans for positioning the piston diaphragm 3 and ooster shell 1 in the circumferential direction is composed of the above positioning projections and holes 3c nd 1c. The inner annular bead 3b is fitted in the annular roove 61 formed on the booster piston 2. The interior pace of the booster shell 1 is divided into a front side rst working chamber A and a rear side second working chamber B by the piston diaphragm 3 and the ooster piston 2.

A pressured area 3d of the piston diaphragm 3 is in lose contact with the rear side of the booster piston 2 nd is formed turned so as to make the diaphragm secon of U-shape projecting into the first working chamer between the outer peripheral surface of the booster iston 2 and the inner peripheral surface of the front de bowl 1F. Therefore, the booster piston 2 can be loved forward and backward with the movement of le U-shaped turning part.

Notches 65 are formed in a rear side wall 61a of said nnular groove 61 on the booster piston 2. Thin-wall ortions 63 facing said notches 65 are formed on the nner annular bead 3b of the piston diaphragm 3 which closely but separably fitted in the rear side of the ooster piston 2. Furthermore, a channel-shaped posioning projection 64 is integrally formed on the peripheral edge of said thin-wall portion 63 and is fitted in said otch 65, so that the relative turning movement of the ooster piston 2 and piston diaphragm 3 can be rericted. That is, a means for positioning the piston iaphragm 3 and booster piston 2 in the circumferential irection is composed of the projection 64 and notch 65.

The first working chamber A is always held in communication with a vacuum source in the form of an ttake manifold (not shown) of an associated internal ombustion engine through a vacuum inlet pipe 4, while le second working chamber B is adapted to be selecvely placed in communication with the first working hamber A or an air inlet port 6 open to the end wall 1e f a rearward extension tube 1d of the booster shell 1 rough a control valve 5 which will be described later detail.

The booster piston 2 is normally biased rearward, or ward the second working chamber B by a return ring 7 arranged under compression in the first workg chamber A. The rearward travel of the booster iston 2 under the spring bias is limited by projections formed on the rear face of the piston diaphragm 3 for utting engagement with the rear inside wall of the ooster shell 1.

A tubular valve casing 8 integrally formed with the ooster piston 2 is axially extending rearward from the ar face of the central portion of the booster piston 2, nd is slidably supported by a plain bearing 9 provided said extension tube 1d while the rear end of which is pen to said air inlet port 6.

The control valve 5 is constructed inside the tubular valve casing 8 as follows: an annular first valve seat $10_1$ is formed on the front inside wall of the tublar valve casing 8; a valve piston 12 connected to an input rod 11 is slidably fitted in the front part of the tubular valve casing 8; and an annular second valve seat $10_2$ encircled by said first valve seat $10_1$ is formed at the rear end of the valve piston 12.

A cylindrical valve element 13 with both ends opened is held at its base end portion 13a between the inside wall of the valve casing 8 and the outer periphery of a valve retainer sleeve 14 fitted in the valve casing 8. The valve element 13 is formed of elastic materials such as rubber or the like and has a thin diaphragm 13b radially extending inward from the base end portion 13a, and a thick valve portion 13c formed at the inner end of the diaphragm 13b and opposed to the first and second valve seats $10_1$ and $10_2$. The valve portion 13c is axially movable owing to the deformation of the diaphragm 13b and capable of abutting engagement with the front end surface of the valve retainer sleeve 14.

An annular reinforcing plate 15 is inlaid in the valve portion 13c and is worked by a valve spring 16 for assisting the valve portion 13c in movement toward both the valve seats $10_1$ and $10_2$.

A space radially outside of the first valve seat $10_1$, a middle space between both the first and second valve seats $10_1$ and $10_2$, and a space radially inside of the second valve seat $10_2$ are respectively in communication with the first working chamber A, the second working chamber B and the air inlet port 6 respectively through a through hole 17 formed in the booster piston 2, another through hole 18 and a space inside the valve element 13.

A large hole 19 is opened in the front center of the booster piston 2 and a small hole 20 is opened at the recessed end of the large hole 19. An elastic piston 21 made of rubber or the like and an output piston 22 of the same diameter with the former are slidably fitted in the large hole 19 in order from the recessed end thereof while a reaction piston 23 of a smaller diameter than that of the elastic piston 21 is slidably fitted in the small hole 20. A small shaft 12a projected from the front end surface of said valve piston 12 is protruded into the small hole 20 and opposed to the rear end surface of the reaction piston 23. The output piston 22 is integrally formed with a forwardly projected output rod 22a.

The input rod 11 is normally biased rearward by a return spring 24 and the rearward travel thereof is limited by abutting engagement of a movable stopper plate 25 screw-fitted to the input rod 11 with the end wall 1e inside of the rearward extension tube 1d. Axial location of the input rod 11 is changed by turning the screw-fitted movable stopper plate 25 and accordingly the retarding limit of the input rod 11 can be adjusted either forward or rearward. The movable stopper plate 25 is fixed after the adjustment by fastening a lock nut 26 also screw-fitted to the input rod 11. The movable stopper plate 25 is provided with a vent 27 for preventing the blocking of the air inlet port 6.

Air filter elements 28 and 29 are fitted in the outer end opening of the tubular valve casing 8 for purifying the air induced through the air inlet port 6 and are transformable in order not to prevent the operation of the input rod 11.

The mechanism for connection of the tie rods 30 and the booster shell 1 will by described hereinafter.

The tie rod 30 is integrally formed with a mounting bolt 33 which is passed through and forwardly protruded from the front wall of the booster shell 1, and a spring retainer plate 34 is closely fitted to the front inside wall of the booster shell 1. The tie rod 30, the spring retainer plate 34 and the front wall of the booster shell 1 are integrally connected with a mounting flange 36 of the brake master cylinder M placed on the front surface of the booster shell 1 by fastening a nut 35 screwed in the tip end of the mounting bolt 33 passed through the mounting flange 36. On this occasion, an annular sealing material 38 for sealing the tie rod through hole in the front wall of the booster shell 1 is filled in an annular groove 37 formed in the front surface of the spring retainer plate 34 encircling the bolt 33. The fixed end of said return spring 7 is supported by said spring retainer plate 34 so that the biasing force of the return spring 7 is loaded to the tie rod 30 to eliminate the loading on the booster shell 1.

Furthermore, the tie rod 30 is integrally formed with a mounting bolt 39 which is passed through and rearwardly protruded from the rear wall of the booster shell 1 and a stepped flange 41 for abutment against the rear inside wall of the booster shell 1. The stepped flange 41 is fitted in a support cylinder 43 welded to the rear inside wall of the booster shell 1 and, by setting a retaining ring 42 in the support cylinder 43, the tie rod 30 and the rear wall of the booster shell 1 are connected together. On this occasion, an annular sealing material 45 for sealing the tie rod through hole in the rear wall of the booster shell 1 is fitted in an annular groove 44 between the smaller step of the stepped flange 41 and the support cylinder 43.

The tie rod 30 is fixed to the front wall W of the compartment by fastening a nut screwed in the tip end of the mounting bolt 39 passed through the front wall W of the automobile compartment.

In this way, the booster shell 1 is fitted to the front wall W of the compartment through the tie rods 30, while the brake master cylinder M is supported by the booster shell 1 through the tie rods 30.

Figure 2:
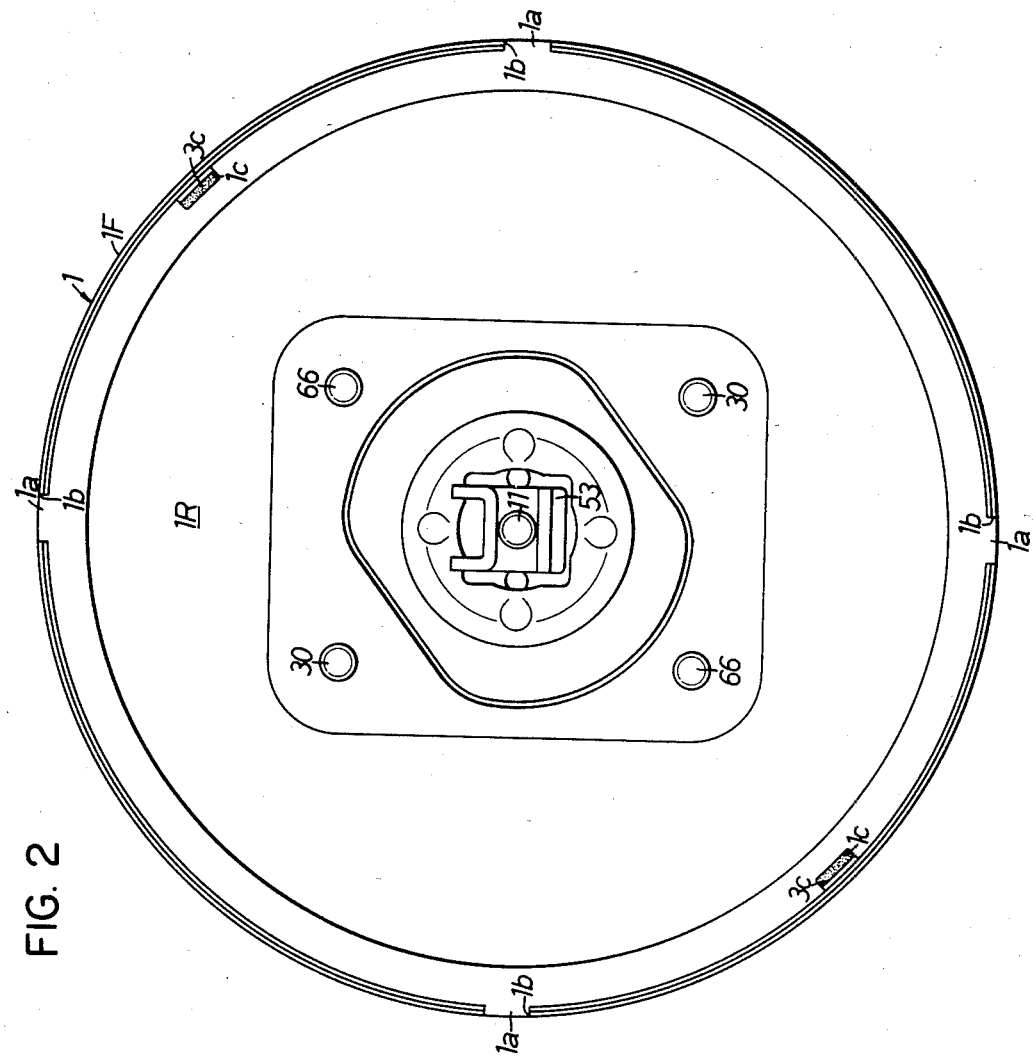
FIG. 2 is a rear elevation showing the device of FIG. 1.
Figure 3:
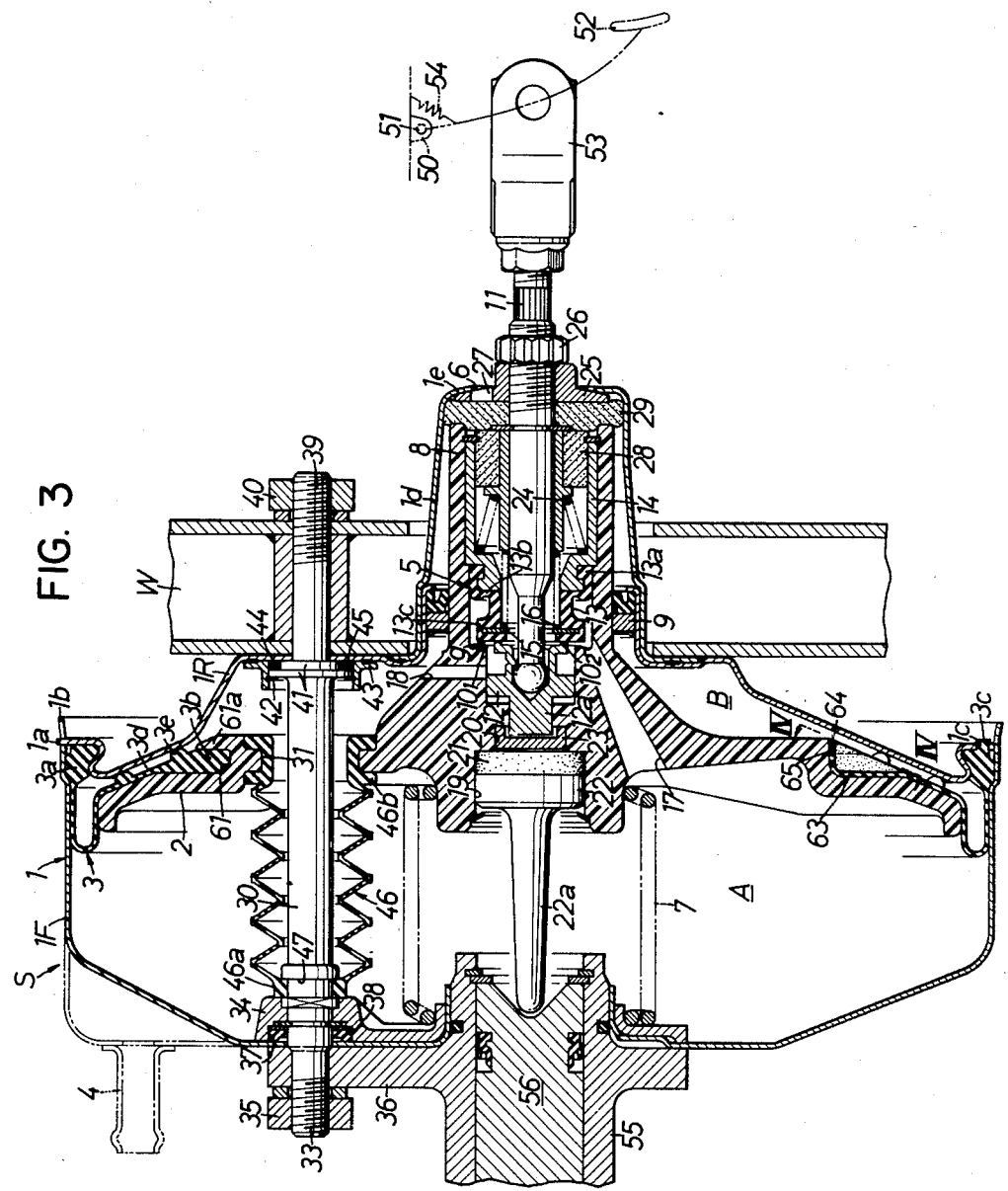
FIG. 3 is a longitudinal cross-section view in side elevation showing the device of FIG. 1.
Figure 4:
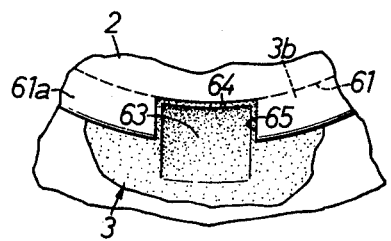
FIG. 4 is a perspective illustration taken along the line IV—IV in FIG. 3.
Figure 5:
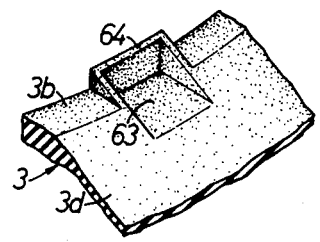
FIG. 5 is a partial perspective illustration showing the piston diaphragm of the device of FIG. 1.

In case of this illustration, as shown in FIG. 2, the two tie rods 30 are arranged at a couple of diagonal square corners, while two bolts 66 simply used for mounting to the compartment wall W are fixed welded to the rear wall of the booster shell 1 at another couple of the diagonal corners.

A sealing means is arranged between the booster piston 2 and the tie rod 30 for sealing the tie rod 30 through hole 31 in the booster piston 2 in such a manner as not to prevent the operation of the booster piston 2. The sealing means comprises a flexible bellows 46 made of elastic material such as rubber or the like and surrounds the tie rod 30 inside the first working chamber A. The front and rear ends 46a and 46b of the bellows 46 are respectively fixed to an annular groove 47 formed at the outer periphery of the tie rods 30 and the through hole 31.

Inside the compartment, a brake pedal 52 jointed at 51 to the fixed bracket 50 is connected to the rear end of the input rod 11 of the booster device S through a connecting fitting 53. Reference number 54 indicates a return spring for retracting the brake pedal 52 rearward.

Rear end of a cylinder body 55 of the brake master cylinder M is protruded into the first working chamber A through the front wall of the booster shell 1, and the output rod 22a of the booster device S is opposed to rear end of a working piston 56 fitted in the cylinder body 55.

Description will next be made of the operation of the embodiment described above.

The drawings indicate the booster device S not in operation, wherein the valve piston 12, input rod 11 and brake pedal 52 connected together are held at a prescribed retracting position with the force of the return spring 24 while a movable stopper plate 25 is abutted to the fixed end wall 1e. Front face of the valve portion 13c is pushed by the valve piston 12 through the second valve seat $10_2$ and retracted until it is slightly touched to the front face of the valve retainer sleeve 14, so that a thin gap g is made between the first valve seat $10_1$ and the valve portion 13c. Above condition can easily be obtained by adjusting the movable stopper plate 25.

In this way, while the engine is in operation, the first working chamber A is always held at vacuum pressure and in communication with the second working chamber B through the through hole 17, the gap g, and the through hole 18. The front opening of the valve portion 13c is closed at the second valve seat $10_2$ so that the vacuum pressure in the first working chamber A is transferred to the second working chamber B and the air pressures in both the working chambers A and B are balanced. Accordingly, the booster piston 2 is also located at the retracted position as shown in the drawings under the bias of the return spring 7.

In the brake operation, when the brake pedal 52 is depressed and the input rod 11 and the valve piston 12 are advanced, the valve portion 13c forwardly biased by the valve spring 16 is advanced following to the valve piston 12, however, since the gap g between the first valve seat $10_1$ and the valve portion 13c is extremely thin as aforementioned, the valve portion 13c is seated on the first valve seat $10_1$ without delay so that the communication between both the working chambers A and B are cut off and, at the same time, the second valve seat $10_2$ is separated from the valve portion 13c so that the second working chamber B is placed into communication with the air inlet port 6 through the through hole 18 and the inside of the valve element 13. Thus the ambient air is induced into the second working chamber B without delay and the chamber B becomes of higher pressure than the first working chamber A. Owing to the above pressure difference between both the chambers A and B, the booster piston 2 is moved forward against the return spring 7 to advance the output rod 22a through the elastic piston 21 so that the working piston 56 of the brake master cylinder M is driven forward and the brake is applied to the vehicle. On this occasion, the thin-wall portion 63 of the annular bead 3b is forcibly brought into close contact with the booster piston 2 under the pressure difference between both the working chambers A and B so that the communication between both the working chambers A and B is completely cut off.

When the working piston 56 is driven, a forward thrust load is applied to the cylinder body 55 and then, through the tie rods 30, transmitted to and supported by the automobile body, that is, the front wall W of the compartment. The load is, therefore, not applied to the booster shell 1.

On the other hand, when a small shaft 12a of the valve piston 12 is advanced and abutted against the elastic piston 21 through the reaction piston 23, the reaction force of the output rod 22a is partly fed back to the side of the brake pedal 52 through the valve piston 2 owing to the expansion toward the side of the reaction piston 23 of the elastic piston 21 caused by the reaction force of the output rod 22a, so that the output of the output rod 22a, or the braking force, can be detected by the drivers.

Subsequently, when the depression on the brake pedal 52 is released, the input rod 11 is first retracted under the reaction force acting on the valve piston 12 and the biasing force of the return spring 24, whereby the second valve seat $10_2$ is seated on the valve portion 13c, which is abutted to the front face of the valve retainer sleeve 14, so that the axial compressive deformation is produced in the valve portion 13c under the retractive force from the input rod 11. In consequence, a gap larger than the inital one is made between the first valve seat $10_1$ and the valve portion 13c and the air pressures in both the working chambers A and B are equalized without delay through said gap. When the above pressure difference is disappeared, the booster piston 2 is retracted under the bias of the return spring 20 and the projection 3e is abutted to the rear inside wall of the booster shell 1 and is stopped. When the input rod 11 is abutted to the end wall 1e, the valve portion 13c is released from the retractive force of the input rod 11 and is restored to the original form thereof so that the gap between the first valve seat $10_1$ and the valve portion 13 can again be reduced to that of small value g.

If the brake pedal 52 is depressed and the booster piston 2 is advanced while the vacuum pressure is not accumulated in the first working chamber A, the air inside the first working chamber A is not sufficiently discharged into the vacuum supply source due to the resistance inside the pipe line or the like, so that the remaining air inside the first working chamber A is compressed. When air pressure of the second working chamber B is exceeded by that of the first working chamber A, a portion of the remaining air inside the first working chamber A enters a space between the rear surface of the booster piston 2 and the front surface of the piston diaphragm 3. Then, the thin-wall portion 3 is pushed rearward and a gap is produced between the booster piston 2 and the thin-wall portion 63 so that both the working chambers A and B are placed into communication with each other through above gap. Therefore, such troubles as the rearwardly swelling transformation in the piston diaphragm 3 caused by excessive rearward pushing force can be prevented since the air pressure inside both the working chambers A and B become balanced with each other through the abovementioned gap without delay. When the above pressure difference is eliminated, the thin-wall portion 3 is again placed into close contact with the booster piston 2.

As has been described above, according to the present invention, the means 1c, 3c for determining the peripheral position of the piston diaphragm 3 with respect to the booster shell 1 are disposed between both the piston diaphragm 3 and the booster shell 1 and the means 64, 65 for determining the peripheral position of the booster piston 2 with respect to the piston diaphragm 3 are disposed between the piston diaphragm 3 and the booster piston 2, so that the booster piston 2 is positioned properly in the peripheral direction with respect to the booster shell 1 through the piston diaphragm 3 to keep the booster piston 2 from being interfered by the tie rods 30 which connect the front and rear walls of the booster shell 1, and the flexible bellows 5 arranged between the booster piston 2 and the tie rod 30 may not be twisted to prevent the reduction of its durability, thereby ensuring the normal operation of the booster device.

Further, the annular groove 67, which is provided on the rear surface of the booster piston 2, has notches 65 formed in its rear side wall 61a and is fitted by the annular bead 3b formed on the inner peripheral edge of the piston diaphragm 3 while the portions of the annular bead 3b facing the notches 65 are formed as thin-wall portions 63 which are closely but separably fitted in the booster piston 2, and the positioning projection 64 integrally formed on the peripheral edge of the thin-wall portion 63 is engaged in the notch 65. Therefore, when no vacuum pressure is accumulated in the first working chamber A due to inoperative condition or trouble or the like of the vacuum supply source, even if the booster piston 2 moves forward to compress the interior of the first working chamber A, the thin-wall portion 63 of the annular bead 3b is separated from the booster piston 2 to place both the working chambers A, B into communication with each other to equalize the air pressures of those chambers. Consequently, any useless pressure can be kept from acting on the piston diaphragm 3 to improve its durability.

Further, in the normal condition in which the first working chamber A stores vacuum pressure therein, the air pressure within the second working chamber B becomes higher than that of the first working chamber A when the booster piston 2 is actuated, whereby the thin-wall portion 63 of the piston diaphragm 3 is, owing to the pressure difference, placed in close contact with the booster piston 2 to securely cut off communication between both the chambers A, B. Therefore, the operation of the booster piston 2 is not hindered.

In addition, the thin-wall portion 63 cooperates with the positioning projection 64, the notch 65 and so forth to constitute a mechanism for determining the relative position between the booster piston 2 and the diaphragm 3 so that the thin-wall portion 63 can serve as one-way air valve and also as a positioning means to remarkably simplify the structure of the device.

While an embodiment of the present invention has been shown and described, it will be apparent to those skilled in the art that various changes and modifications may be made therein without departing from the spirit of the invention or the scope of the appended claims.

What is claimed is:

1. In a vacuum booster device comprising a booster shell, an axially slidable booster piston accommodated in said booster shell, a piston diaphragm the inner and outer peripheral edges of which are respectively fixed to the rear surface of said booster piston and the inner peripheral surface of said booster shell, a front side first working chamber and a rear side second working chamber defined in said booster shell by said booster piston and said piston diaphragm, said first working chamber communicating with a vacuum supply source, said second working chamber selectively communicating with said first working chamber or the external atmosphere through a control valve, an input rod arranged opposite to said booster piston for movement toward and away from the latter and connected to said control valve so as to produce a pressure difference between both of said working chambers effective to cause said booster piston to follow forward movement of said input rod, tie rods extending through said booster piston for connection of the front and rear walls of said booster shell, and a flexible bellows arranged between said tie rod and said booster piston, said flexible bellows enabling said booster piston to be operable, the improvement which comprises positioning means for circumferentially peripherally positioning said piston diaphragm on said booster shell and for preventing relative relation therebetween which are arranged between said booster shell and said piston diaphragm, and positioning means for circumferentially peripherally positioning said booster piston on said piston diaphragm and for preventing relative rotation therebetween which are arranged between said piston diaphragm and said booster piston, said means for circumferentially peripherally positioning said booster piston with respect to said piston diaphragm being adapted to engage the piston and the diaphragm together by radial concavo-convex engagement.

2. A device as set forth in claim 1, wherein an annular bead formed around the inner peripheral edge of said piston diaphragm is fitted in an annular groove formed on the rear surface of said booster piston.

3. A device as set forth in claim 2, wherein said means for circumferentially peripherally positioning said booster piston on said piston diaphragm comprises a thin-wall portion facing a notch formed in the rear side wall of said annular groove on said booster piston, said thin wall portion being closely but separably fitted in said booster piston, and a positioning projection formed on the peripheral edge of said thin-wall portion and is fitted in said notch.

* * * * *